(12) United States Patent
Malhotra

(10) Patent No.: US 10,570,013 B2
(45) Date of Patent: Feb. 25, 2020

(54) METHODS TO MAKE AMMONIUM PERCHLORATE

(71) Applicant: Malvi Technologies, LLC, Cedar City, UT (US)

(72) Inventor: Vinod Malhotra, Cedar City, UT (US)

(73) Assignee: MALVI TECHNOLOGIES, LLC, Cedar City, UT (US)

( * ) Notice: Subject to any disclaimer, the term of this patent is extended or adjusted under 35 U.S.C. 154(b) by 0 days.

(21) Appl. No.: 15/791,084

(22) Filed: Oct. 23, 2017

(65) Prior Publication Data

US 2018/0111832 A1 Apr. 26, 2018

Related U.S. Application Data

(60) Provisional application No. 62/412,556, filed on Oct. 25, 2016.

(51) Int. Cl.
| | | |
|---|---|---|
| C25B 1/00 | (2006.01) | |
| C01B 11/18 | (2006.01) | |
| C25B 1/28 | (2006.01) | |
| C25B 9/10 | (2006.01) | |
| C25B 15/00 | (2006.01) | |
| C25B 1/26 | (2006.01) | |

(52) U.S. Cl.
CPC .......... *C01B 11/185* (2013.01); *C25B 1/265* (2013.01); *C25B 1/28* (2013.01); *C25B 9/10* (2013.01); *C25B 15/00* (2013.01); *C01P 2004/60* (2013.01)

(58) Field of Classification Search
CPC ......... C01B 11/185; C25B 1/28; C25B 1/265; C25B 15/00; C25B 9/10
See application file for complete search history.

(56) References Cited

U.S. PATENT DOCUMENTS

| | | | | |
|---|---|---|---|---|
| 2,739,873 | A * | 3/1956 | Schumacher | |
| 3,218,121 | A * | 11/1965 | Tufts | C01B 11/185 423/476 |
| 5,004,527 | A * | 4/1991 | Millet | C25B 1/28 205/474 |
| 5,131,989 | A * | 7/1992 | Dotson | C01B 11/185 205/474 |
| 6,495,025 | B2 * | 12/2002 | Velev | C25B 1/04 204/263 |
| 9,090,979 | B2 * | 7/2015 | Okuyama | C25B 1/28 |

* cited by examiner

*Primary Examiner* — Arun S Phasge
(74) *Attorney, Agent, or Firm* — Dorsey & Whitney LLP

(57) ABSTRACT

Embodiments of the invention relate to methods and systems for producing ammonium perchlorate.

31 Claims, 1 Drawing Sheet

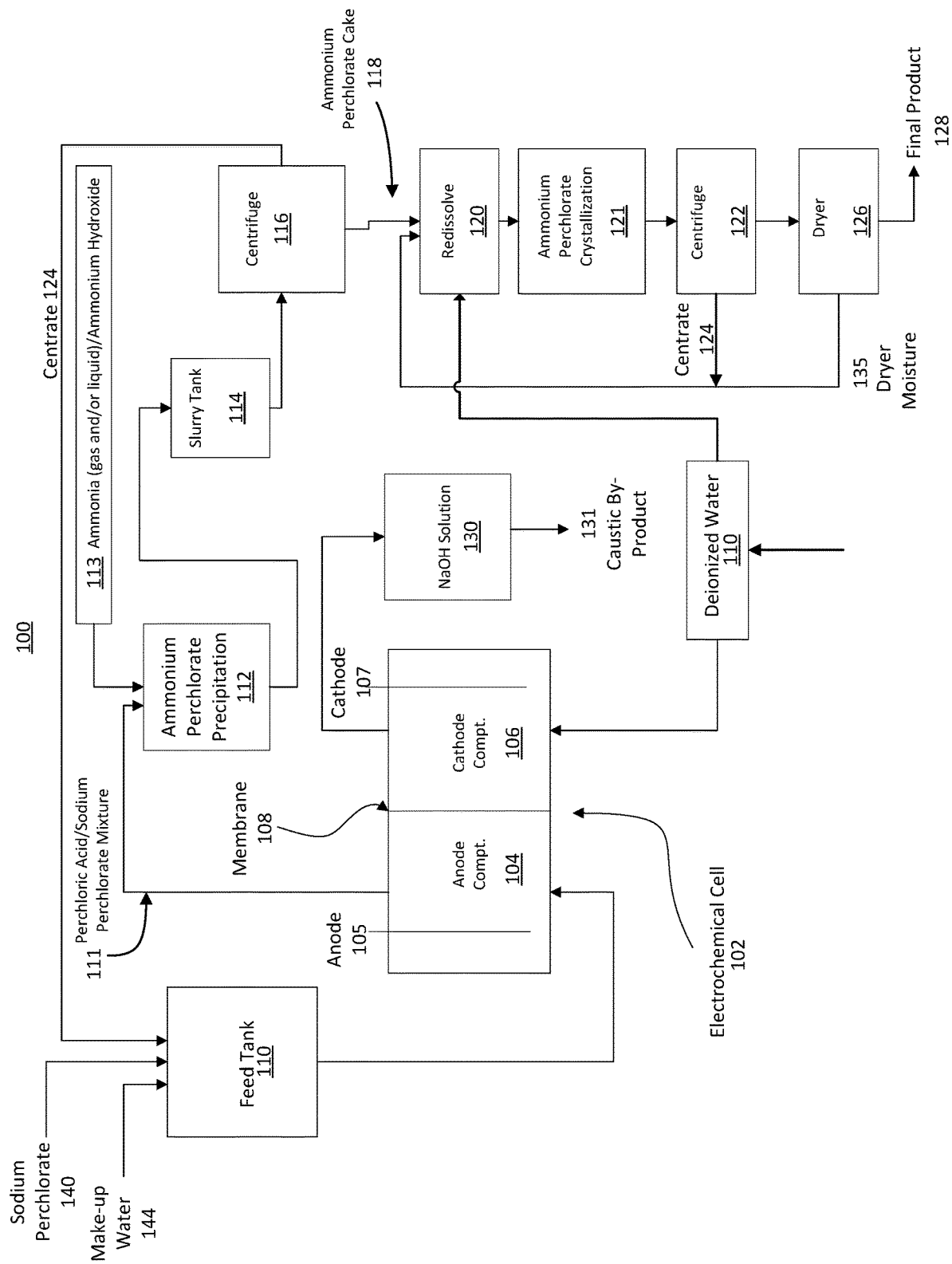

METHODS TO MAKE AMMONIUM PERCHLORATE

BACKGROUND

Ammonium perchlorate is produced from sodium perchlorate by mixing sodium perchlorate solution with ammonium chloride, heating the solution mixture to about 100° C. and then cooling it at a controlled rate to achieve the desired particle size distribution. Ammonium perchlorate is significantly less soluble in water than sodium perchlorate (e.g., 115 g/l vs. 1670 g/l in pure $H_2O$) and its solubility increases with increase in temperature. On cooling the solution mixture, ammonium perchlorate precipitates out of the solution mixture, producing slurry consisting of ammonium perchlorate crystals in a mother liquor mostly comprised of sodium chloride. Controlled cooling and/or mechanical rounding of crystals are done to produce crystals meeting to the particle size distribution required in the final product. The ammonium perchlorate crystals are separated from the mother liquor, washed with water to remove sodium and chloride contaminants, and dried to produce the final product.

The mother liquor is mostly a sodium chloride solution in this process with some dissolved perchlorates. It is evaporated in a salt evaporator, which is typically an expensive piece of equipment built with exotic materials to avoid serious chloride corrosion issues. Such equipment is required to produce salt which is recycled back to the front end of the closed process loop for producing sodium perchlorate electrochemically which is then used for producing more ammonium perchlorate as noted above.

There are many issues with the chloride based processes. For example, the process requires salt evaporators built with exotic and expensive material(s) to produce salt. Being a chloride-based process, equipment corrosion is a serious plant-wide issue, which not only requires the use of process equipment built from the salt-resistant material(s) but also to keep the plant equipment to be well maintained at all times, costing resources and money. The by-product of the process, sodium chloride, is contaminated with perchlorate and if it is not recycled, which would be the case if the purchased sodium perchlorate is used for ammonium perchlorate production instead of the site-produced sodium perchlorate, its disposal is a serious issue, a source of liability instead of revenue. Another issue with the process is that the ammonium perchlorate crystals are separated from a chloride-rich solution. To meet the chloride specification of the final product, it requires thorough washing of the ammonium perchlorate cake prior to its drying, adding more steps to the production process, making it complex and difficult to control, and at times requiring re-dissolving and re-crystallization of the final product to achieve the desired chloride specification in the final product.

In some operations, ammonium sulfate is used, instead of ammonium chloride, to produce ammonium perchlorate from sodium perchlorate. It surely helps the corrosion issue, but does not help the perchlorate-contaminated by-product (sodium sulfate) disposal issue. In this case also, like the process described earlier with ammonium chloride, the by-product does not contribute to the revenue; instead it consumes revenue.

SUMMARY

Embodiments of the invention relate to methods and systems of producing ammonium perchlorate.

In an embodiment, a method of producing ammonium perchlorate is disclosed. The method includes passing a sodium perchlorate solution through an anodic chamber of an electrochemical cell. The method includes passing water through the cathodic chamber of the electrochemical cell. The method includes biasing a cathode and an anode of the electrochemical cell with a cation membrane, effective to produce a perchloric acid in predominantly sodium perchlorate solution and oxygen gas (with a very small (e.g., trace) amount of chlorine gas if the sodium perchlorate solution contains trace levels of chloride contamination) in the anodic chamber, and sodium hydroxide and hydrogen gas in the cathodic chamber. The method includes neutralizing the perchloric acid in solution with an ammonium hydroxide solution to produce an ammonium perchlorate precipitate therefrom. The method includes separating the ammonium perchlorate precipitate from the slurry of precipitated ammonium perchlorate in sodium perchlorate. The method includes washing the ammonium perchlorate precipitate to remove any residual sodium therefrom. The method includes drying the ammonium perchlorate precipitate.

In an embodiment, a method of producing ammonium perchlorate is disclosed. The method includes passing a sodium perchlorate solution through an anodic chamber of an electrochemical cell. The method includes circulating water through the cathodic chamber of the electrochemical cell. The method includes biasing a cathode and an anode of the electrochemical cell, effective to produce a perchloric acid in predominantly sodium perchlorate solution and oxygen gas (with a trace amount of chlorine gas if the sodium perchlorate solution has trace levels of chloride contamination) in the anodic chamber, and sodium hydroxide and hydrogen gas in the cathodic chamber. The method includes neutralizing the perchloric acid solution with ammonia gas to produce an ammonium perchlorate precipitate therefrom. The method includes separating the ammonium perchlorate precipitate from the predominantly sodium perchlorate solution. The method includes washing the ammonium perchlorate precipitate to remove any residual sodium therefrom. The method includes drying the ammonium perchlorate precipitate.

In an embodiment, a system for producing ammonium perchlorate is disclosed. The system includes a feed tank housing a supply of sodium perchlorate feed solution. The system includes an electrochemical cell including an anode compartment including an anode therein, a cathode compartment including a cathode therein, a cationic membrane disposed between the cathode compartment and the anode compartment, the anode compartment is fluidly coupled to the feed tank and the cathode compartment is fluidly coupled to a deionized water supply. The system includes an ammonium perchlorate precipitation vessel operably coupled to an output of the anode compartment and a by-product collection vessel operably coupled to an output of the cathode compartment. The system includes a slurry tank operably coupled to the ammonium perchlorate precipitation vessel. The system includes a liquid-solid separation apparatus operably coupled to the slurry tank and configured to separate ammonium perchlorate precipitate from a sodium perchlorate liquor.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

FIG. 1 is a schematic of a method of producing ammonium perchlorate according to an embodiment.

DETAILED DESCRIPTION

Embodiments of the invention relate to methods and systems for producing ammonium perchlorate.

FIG. 1 is a schematic diagram of a method 100 of making ammonium perchlorate according to an embodiment. The method 100 includes an electrochemical process, which uses membrane-divided electrochemical cells. Each membrane-divided electrochemical cell 102 is divided into an anodic chamber (e.g., anode compartment 104) having an anode 105 therein and a cathodic chamber (e.g., cathode compartment 106) having a cathode 107 therein, by a cationic membrane 108. Sodium perchlorate (e.g., commercially available sodium perchlorate) is dissolved in water to a known concentration in a feed tank 110 and it is fed into and passed through the anodic chamber of the membrane-divided electrochemical cells 102, where a (electrical) bias, such as direct current, can be applied to initiate electrolysis to oxidize water, producing oxygen and protons that combine with some perchlorate ions of the feed to form perchloric acid in a predominately sodium perchlorate solution. The acid production is controlled to a low concentration, such as about 5 wt % to about 10 wt %, to keep the current efficiency of the process high, such as greater than 70% by reducing the competition of the protons to the only other positive ions in solution—sodium and trace levels of ammonium—for moving to the catholyte side (e.g., cathode compartment 106) of the cell (102). It is preferred that the sodium ions, and not the protons, are transported to the catholyte side and this objective is realized by keeping the molarity of the sodium ions in solution at a significantly higher concentration than the molarity of the protons. By keeping the concentration of the produced perchloric acid low, the transportation of the sodium ions to the catholyte side is enhanced, leading to the higher current efficiency. For example, in some embodiments, the perchloric acid produced at the anode is more than 0.1 wt % of the solution passing thereby. The bias applied to the anode 105 and/or the cathode 107 and/or the current density of the operation can be greater than about 0.1 amps/sq inch. The temperature of operation is controlled at a temperature greater than about 20° C.

Due to the charge neutrality principle, some of the sodium ions of the solution in anodic chamber can migrate to the solution in the cathodic chamber via the cationic membrane 108 where they may combine with hydroxyl ions produced by the reduction of water, to form hydrogen and substantially a pure sodium hydroxide solution, which may be captured and sold or used. If trace levels of ammonium ions are present in the anode solution due to recycling of ammonium perchlorate mother liquor from the ammonium perchlorate precipitation step back to the anode feed solution, migration of some of the ammonium ions to the cathode side is remotely likely. In such examples, the basicity of the cathode solution may convert ammonium ions to ammonia gas, which can be scrubbed with water to produce ammonium hydroxide solution that can be used, along with the fresh ammonium hydroxide solution, in the ammonium perchlorate precipitation step.

The perchloric acid and predominantly sodium perchlorate solution mixture 111 produced in the anodic chamber 104 is received in an ammonium perchlorate precipitation vessel 112 (e.g., tank), where it is combined (e.g., mixed) with an ammonium hydroxide solution and/or with ammonia gas and/or liquid ammonia to produce ammonium perchlorate precipitate (e.g., crystals). The solution mixture 111 (predominantly sodium perchlorate solution having ammonium perchlorate therein combined with the ammonia) can be cooled to about 0° C. or below to facilitate as much ammonium perchlorate precipitation as feasible due to common ion (perchlorate) effect and also due to the inverse solubility relationship of ammonium perchlorate with temperature. The ammonium perchlorate precipitate slurry can be cooled in or moved to a slurry tank 114 after cooling. The ammonium perchlorate precipitate can be separated out from the slurry using liquid-solid separation apparatus 116, such as a centrifuge. Separating the ammonium perchlorate precipitate from the slurry of precipitated ammonium perchlorate in the predominantly sodium perchlorate solution can include centrifuging or any other separation technique. An ammonium perchlorate 118 cake may be formed by the separation technique. The ammonium perchlorate cake 118 is washed with cold water or with a saturated solution of ammonium perchlorate to remove any residual sodium impurities. The ammonium perchlorate cake can be dried, if it meets the crystal size distribution requirements of the final product. Alternatively, the ammonium perchlorate cake can be dissolved in hot water and (re)crystallized under controlled cooling rate conditions to produce crystals meeting the selected crystal size distribution requirement of the final product. The ammonium perchlorate cake can be dissolved in a dissolution vessel 120 (e.g., redissolve tank). In examples, the dissolved ammonium perchlorate can be recrystallized such as in the dissolution vessel 120 or a recrystallization vessel 121. After or during this recrystallization, the crystals can be mechanically sized and/or shaped (e.g., rounded) using a mechanical rounding device (not shown), such as a grinding pump or a high speed agitator, or any other suitable device. The temperature of the water used to dissolve the ammonium perchlorate cake can be at least −5° C. (e.g., at least about 0° C., at least about 10° C., or at least about 20° C.).

Recrystallizing the ammonium perchlorate can include cooling the dissolved ammonium perchlorate solution (e.g., solution containing the dissolved ammonium perchlorate) indirectly with a cooling media (e.g., water or an organic cooling solution) to produce recrystallized ammonium perchlorate crystals having a selected crystal size distribution. Cooling the dissolved ammonium perchlorate solution with the cooling media can include cooling the dissolved ammonium perchlorate solution with the cooling media to a temperature of about 20° C. or more, about 10° C. or more, about 0° C. or more, about 0° C. or less, about 10° C. or less, about −10° C. or less, or about −15° C. or less. The temperature to which the dissolved ammonium perchlorate solution is lowered can be selected to produce a selected average crystal size upon crystal growth of the ammonium perchlorate as the temperature decreases. For example, if smaller crystals are desired, a lower temperature (e.g., −15° C.) can be selected. Or, if larger crystals are desired, a relatively higher temperature (e.g., about 20° C.) can be selected. The cooling media can have a temperature of about 10° C. or more, about −15° C. or more, about −15° C. or less, or about 10° C. or less. In examples, the cooling rate during recrystallization of ammonium perchlorate may be selectively controlled to obtain a selected particulate distribution. The cooling rate may be selected based on one or more parameters such as concentration of ammonium perchlorate solution being cooled, temperature of cooling media, degree of agitation of ammonium perchlorate solution being cooled, surface type of the heat exchanger used, etc. In examples, the rate may be as low as between 1 to 2 degree centigrade/hour, a medium cooling rate may be 2 degree centigrade/hour to 10 degree centigrade/hour, or a high cooling rate may be about 10 degree centigrade/hour or more.

After cooling the recrystallized ammonium perchlorate crystals, the crystals may be disposed in a slurry. The crystals in the recrystallized slurry can be separated from the liquid therein (e.g., centrifuged) such as in a second liquid-solid separation apparatus 122. In some examples, the recrystallized slurry can be centrifuged a second time in first liquid solid-separation apparatus 116 rather than in the second liquid-solid separation apparatus. The centrate (e.g., sodium perchlorate solution) from either the first centrifuge or the second centrifuge can be recycled for use in the feed tank 110 or dissolution vessel 120. For example, production of ammonium perchlorate can include recycling sodium perchlorate centrate 124 from the combined perchloric acid and ammonium hydroxide solutions back to the electrochemical cell 102 or feed tank 110. The ammonium perchlorate cake resulting from the processes herein can be dried, in a dryer 126, to produce the final ammonium perchlorate product 128. Moisture 135 from the dryer may be recirculated back to the dissolution vessel 120.

The filtrate or centrate 124 from the liquid/solids separation step, mostly sodium perchlorate, may be returned back to the feed tank 110, where sodium perchlorate is added to make up for the perchlorate lost to the ammonium perchlorate production and the sodium lost to sodium hydroxide production, or may be returned back to the redissolve tank 120. In embodiments, any of the acts used to produce ammonium perchlorate disclosed herein can be collectively or individually carried out at any of a number of temperatures, such as below about 1° C., below about 10° C., below about 0° C., above about 1° C., above about 10° C., above about 0° C., or below about −10° C.

On the catholyte side (e.g., cathode compartment 106) of the membrane-divided electrochemical cell 102, the sodium ions in the anodic chamber solution, migrate from the anolyte side (e.g., anode compartment 104) of the membrane-divided electrochemical cell 102 via the cationic membrane 108 to the catholyte side, where they combine with the hydroxyl ions produced by the cathodic reduction of water in the cathodic chambers of the cells to produce premium quality sodium hydroxide solution—a by-product of the process—and hydrogen gas. One or more of the sodium hydroxide and the hydrogen gas can be captured for use or sale. The hydrogen gas can be used to generate power or can be bottled for sale.

The trace amount of chlorate ions in the sodium perchlorate solution or the recycling sodium perchlorate solution, if present (e.g., in the feed tank) can be converted to chloride chemically or by using a catalyst.

The disclosed process produces premium quality sodium hydroxide solution as a caustic by-product of the disclosed process, which is an attractive feature of the disclosed process. The sodium hydroxide can be captured, such as in storage vessel 130, and stored or sold as a caustic by-product 131. Its sale can contribute to a good source of revenue, off-setting somewhat the costs for the purchased sodium perchlorate and ammonium hydroxide chemicals consumed by the process, making the process cost-effective. The process is simple, clean, does not produce perchlorate contaminated by-product to dispose of, which is becoming increasingly difficult and expensive to do because of the stringent standards for perchlorate in ground water. Absence of chloride in the process eliminates equipment corrosion issues, providing savings in the maintenance and equipment costs as well. In some examples, trace amounts of chlorine contamination may be present in the off-gases produced in the anodic chamber. In such examples, the chlorine in the off-gases may be scrubbed with a slightly caustic solution (e.g., 7.5 to 10 pH) to produce hypochlorite for sale.

FIG. 1 can be also viewed as a schematic for a system 100 for making ammonium perchlorate. The system can include a feed tank 110 housing a supply of sodium perchlorate feed solution. The feed tank 110 can be operably coupled to a supply 140 of sodium perchlorate and a supply 144 of make-up water. The feed tank 110 can be operably coupled to the electrochemical cell 102 (e.g., a cation membrane separated electrochemical cell). The electrochemical cell 102 can include an anode compartment 104 having an anode 105 therein, a cathode compartment 106 having a cathode 107 therein, a cationic membrane 108 disposed between them and separating the cathode compartment 106 from the anode compartment 104. The anode 105 can include an acid-generating and corrosion resistant material, such as a dimensionally stable anode. The cathode 107 can include one or more of stainless steel, nickel, iron, alloys thereof, graphite, or combinations of any of the foregoing. The cationic membrane 108 can be any commercially available membrane. The fluid (e.g., sodium perchlorate feed) tank can be operably coupled to the anode compartment 104 of the electrochemical cell 102. The cathode compartment 106 can be fluidly coupled to a deionized water supply. The output of the anode compartment 104 (e.g., perchloric acid in predominately sodium perchlorate) can be operably coupled to an ammonium perchlorate precipitation vessel 112. The output of the cathode compartment can be operably coupled to a by-product collection vessel 130 or conduit configured to receive sodium hydroxide by-product therefrom. The ammonium perchlorate precipitation vessel 112 can be operably coupled to a supply 113 of one or more of ammonia (one or both of gas or liquid), water, or ammonium hydroxide. The addition of one or more of water, ammonia, or ammonium hydroxide to the product of the anode compartment 104 (e.g., sodium perchlorate and perchloric acid mixture 111) causes ammonium perchlorate crystals to precipitate out of solution (depending upon the temperature of the solution).

The system 100 can include a slurry tank 114 operably coupled to the ammonium perchlorate precipitation vessel 112. The system 100 can include a liquid-solid separation apparatus 116 operably coupled to the slurry tank 114 and configured to separate ammonium perchlorate precipitate from a sodium perchlorate mother liquor produced in the ammonium perchlorate precipitation vessel. The liquid-solid separation apparatus 116 can include a centrifuge or filter. The liquid-solid separation apparatus 116 can be operably coupled to the feed tank 110 via one or more conduits therebetween. The one or more conduits can be configured to carry sodium perchlorate solution separated from the ammonium perchlorate precipitate in the liquid-solid separation apparatus 116 back to the feed tank 110 for reuse therein. The system may include a scrubber (not shown) operably coupled to the electrochemical cell 102 (e.g., via one or more conduits) to scrub the anodic off gases, chlorine in particular, with a slightly caustic solution to produce hypochlorite for sale.

The system 100 can include a wash vessel (not shown) or apparatus configured to wash the separated ammonium perchlorate with water or a saturated ammonium perchlorate solution. The system 100 can include a dissolution vessel 120 having a solution therein composed and maintained at a temperature configured to dissolve the separated ammonium perchlorate precipitate (e.g., from the liquid-solid separation apparatus). The system 100 can include a recrystallization vessel 121 configured to controllably cool and recrystallize the dissolved ammonium perchlorate solution (e.g., solution containing the dissolved ammonium perchlorate precipitate) to a selected average crystal size. In embodiments, the dissolution vessel 120 and the recrystallization vessel 121 are the same vessel. In embodiments, the system 100 can include a mechanical rounding device (not shown) that can mechanically size and/or shape (e.g., round) the ammonium perchlorate precipitate and/or crystals (e.g., recrystallized ammonium perchlorate obtained from the dissolved ammonium perchlorate solution) to a selected shape (e.g., round) and/or size distribution. The mechanical rounding device can include any device capable of shaping or sizing a crystal, such as a grinding pump, a high speed agitator, or the like. In some embodiments, the dissolution vessel 120 and the recrystallization vessel 121 are the same vessel and can be operably coupled to the mechanical rounding device. In such embodiments, a temperature control mechanism can be included to control the temperature in the vessel and thereby the dissolution and crystallization therein. The temperature control mechanism can include a heater, a cooler, a cold fluid supply, a hot fluid supply, or any other temperature control means. In embodiments, having a recrystallization vessel 121, a second liquid-solid separation apparatus can be used or the recrystallized ammonium perchlorate slurry can be placed in the first liquid-solid separation apparatus. The system 100 can include a dryer 126 configured to dry the separated ammonium perchlorate crystals. Such a dryer 126 can include an oven, a blower, or any other drying device. In examples, one or more conduits may be disposed between and fluidly couple one or more components of the system 100.

While various aspects and embodiments have been disclosed herein, other aspects and embodiments are contemplated. The various aspects and embodiments disclosed herein are for purposes of illustration and are not intended to be limiting.

What is claimed is:

1. A method of producing ammonium perchlorate, the method comprising:
   passing a sodium perchlorate solution through an anodic chamber of an electrochemical cell;
   chemically or catalytically controlling an amount of chlorate in the sodium perchlorate solution;
   circulating water through a cathodic chamber of the electrochemical cell;
   biasing a cathode and an anode of the electrochemical cell having a cation membrane effective to produce a perchloric acid in predominantly sodium perchlorate solution and oxygen gas in the anodic chamber, and sodium hydroxide and hydrogen gas in the cathodic chamber;
   neutralizing the perchloric acid in solution with an ammonium hydroxide solution to produce an ammonium perchlorate precipitate therefrom;
   separating the ammonium perchlorate precipitate from the slurry of precipitated ammonium perchlorate in sodium perchlorate;
   washing the ammonium perchlorate precipitate to remove any residual sodium therefrom; and
   drying the ammonium perchlorate precipitate.

2. The method of claim 1, wherein biasing a cathode and an anode of the electrochemical cell, effective to produce a perchloric acid solution in predominantly sodium perchlorate solution and oxygen gas in the anodic chamber, and sodium hydroxide and hydrogen gas in the cathodic chamber includes producing sodium hydroxide in the cathodic chamber.

3. The method of claim 2, further comprising capturing the sodium hydroxide.

4. The method of claim 1, wherein the anode includes an acid-generating and corrosion-resistant material.

5. The method of claim 4, wherein the anode includes a dimensionally stable anode.

6. The method of claim 1, wherein the cathode includes one or more of stainless steel, nickel, iron, alloys thereof, graphite, or combinations of any of the foregoing.

7. The method of claim 1, wherein the one or more of passing, circulating, biasing, combining, separating, or drying is carried out at a temperature of about 1° C. or more.

8. The method of claim 1, wherein biasing a cathode and an anode of the electrochemical cell, effective to produce a perchloric acid in predominantly sodium perchlorate solution and oxygen gas in the anodic chamber, and sodium hydroxide and hydrogen gas in the cathodic chamber is carried out at a current density greater than about 0.1 amps/inch.

9. The method of claim 1, wherein the perchloric acid produced at the anode is more than 0.1 wt % of the solution passing thereby.

10. The method of claim 1, wherein combining the perchloric acid solution with an ammonium hydroxide solution to produce an ammonium perchlorate precipitate therefrom includes combining the perchloric acid solution with one or more of ammonia gas or liquid ammonia to produce the ammonium perchlorate precipitate.

11. The method of claim 10, further comprising re-dissolving the ammonium perchlorate precipitate in hot water to form a solution and then cooling the solution at a controlled rate indirectly with a cooling media to produce ammonium perchlorate crystals having a selected particle size distribution.

12. The method of claim 10, further comprising mechanically rounding the ammonium perchlorate crystals having the selected particle size distribution with a mechanical rounding device coupled with the crystallizer to a selected final crystal size distribution matching a product specification.

13. The method of claim 1, further comprising recrystallizing the ammonium perchlorate precipitate by dissolving the ammonium perchlorate precipitate in hot water and cooling the dissolved ammonium perchlorate in the cooled hot water at a controlled rate to produce ammonium perchlorate precipitate having a selected crystal size distribution.

14. The method of claim 13, wherein a temperature of the water used to dissolve the ammonium perchlorate precipitate is at least about 20° C.

15. The method of claim 13, wherein cooling the dissolved ammonium perchlorate precipitate in the water to produce ammonium perchlorate precipitate having a selected crystal size includes cooling the dissolved ammonium perchlorate precipitate in the water to a temperature of about −5° C. or more.

16. The method of claim 13, wherein cooling the dissolved ammonium perchlorate precipitate in the water to produce ammonium perchlorate precipitate having a selected crystal size includes cooling the dissolved ammonium perchlorate precipitate with a cooling media including one or more of water or an organic coolant solution.

17. The method of claim 16, wherein the organic coolant solution includes a temperature of less than about −15° C.

18. The method of claim 1, further comprising capturing the hydrogen gas produced at the cathode.

19. The method of claim 18, further comprising generating power using the hydrogen gas produced at the cathode.

20. The method of claim 1, wherein separating the ammonium perchlorate precipitate from the slurry of precipitated ammonium perchlorate in sodium perchlorate includes centrifuging the slurry of precipitated ammonium perchlorate to produce ammonium perchlorate crystals and a centrate.

21. The claim of method 20, further comprising recycling the centrate back to one or more of the electrochemical cell or a dissolution tank.

22. The method of claim 21, further comprising chemically controlling an amount of chlorate in the sodium perchlorate recycled back to the electrochemical cell.

23. A method of producing ammonium perchlorate, the method comprising:
  passing a sodium perchlorate solution through an anodic chamber of an electrochemical cell;
  chemically or catalytically controlling an amount of chlorate in the sodium perchlorate solution;
  circulating water through a cathodic chamber of the electrochemical cell;
  biasing a cathode and an anode of the electrochemical cell, effective to produce a perchloric acid in predominantly sodium perchlorate solution and oxygen gas in the anodic chamber, and sodium hydroxide and hydrogen gas in the cathodic chamber;
  neutralizing the perchloric acid in the predominantly sodium perchlorate solution with ammonia gas to produce an ammonium perchlorate precipitate therefrom;
  separating the ammonium perchlorate precipitate from the predominantly sodium perchlorate solution;
  washing the ammonium perchlorate precipitate to remove any residual sodium therefrom; and
  drying the ammonium perchlorate precipitate.

24. A system for producing ammonium perchlorate, the system comprising:
  a feed tank housing a supply of sodium perchlorate feed solution, wherein the feed tank is configured to chemically or catalytically control an amount of chlorate in the sodium perchlorate solution;
  an electrochemical cell including an anode compartment including an anode therein, a cathode compartment including a cathode therein, a cationic membrane disposed between and at least partially separating the cathode compartment and the anode compartment, the anode compartment is fluidly coupled to the feed tank and the cathode compartment is fluidly coupled to a deionized water supply;
  an ammonium perchlorate precipitation vessel operably coupled to an output of the anode compartment and a by-product collection vessel operably coupled to an output of the cathode compartment;
  a slurry tank operably coupled to the ammonium perchlorate precipitation vessel;
  a liquid-solid separation apparatus operably coupled to the slurry tank and configured to separate ammonium perchlorate precipitate from a sodium perchlorate liquor.

25. The system of claim 24, further comprising a wash apparatus configured to wash the separated ammonium perchlorate precipitate with water or a saturated ammonium perchlorate solution.

26. The system of claim 24, further comprising:
  a dissolution vessel having a solution therein composed and maintained at a temperature configured to dissolve the separated ammonium perchlorate precipitate; and
  a recrystallization vessel configured to controllably cool and recrystallize the dissolved ammonium perchlorate precipitate to a selected average crystal size distribution.

27. The system of claim 26, wherein the dissolution vessel and the recrystallization vessel are the same vessel.

28. The system of claim 26, further comprising a mechanical rounding device configured to mechanically size and shape the ammonium perchlorate precipitate to a selected average crystal size distribution.

29. The system of claim 24, wherein the liquid-solid separation apparatus includes a centrifuge.

30. The system of claim 24, further comprising a dryer configured to dry the separated ammonium perchlorate crystals.

31. The system of claim 30, further comprising a fluid line between the liquid-solid separation apparatus and the feed tank, the fluid line being configured to carry sodium perchlorate from the liquid-solid separation apparatus back to the feed tank.

* * * * *